(12) United States Patent
Henze et al.

(10) Patent No.: US 9,156,024 B2
(45) Date of Patent: Oct. 13, 2015

(54) CATALYST COMPRISING RUTHENIUM AND SILVER AND/OR CALCIUM FOR THE OXIDATION OF HYDROGEN CHLORIDE

(75) Inventors: Guido Henze, Buerstadt (DE); Heiko Urtel, Bobenheim-Roxheim (DE); Martin Sesing, Waldsee (DE); Martin Karches, Neustadt (DE)

(73) Assignee: BASF SE, Ludwigshafen (DE)

( * ) Notice: Subject to any disclaimer, the term of this patent is extended or adjusted under 35 U.S.C. 154(b) by 602 days.

(21) Appl. No.: 13/148,859

(22) PCT Filed: Feb. 25, 2010

(86) PCT No.: PCT/EP2010/052378
§ 371 (c)(1),
(2), (4) Date: Oct. 18, 2011

(87) PCT Pub. No.: WO2010/097424
PCT Pub. Date: Sep. 2, 2010

(65) Prior Publication Data
US 2012/0027665 A1    Feb. 2, 2012

(30) Foreign Application Priority Data

Feb. 26, 2009   (EP) ................................. 09153716

(51) Int. Cl.
*C01B 7/00*     (2006.01)
*B01J 23/00*    (2006.01)
*B01J 23/02*    (2006.01)
(Continued)

(52) U.S. Cl.
CPC ........ *B01J 23/50* (2013.01); *B01J 23/58* (2013.01); *C01B 7/04* (2013.01); *B01J 21/04* (2013.01);
(Continued)

(58) Field of Classification Search
USPC ......... 502/327, 328, 330, 332, 341, 348, 355, 502/415, 439; 423/502
See application file for complete search history.

(56) References Cited

U.S. PATENT DOCUMENTS 5,672,797 A * 9/1997 Kocal .......................... 585/467
7,910,517 B2 * 3/2011 Schubert et al. ............. 502/346
(Continued)

FOREIGN PATENT DOCUMENTS

DE    10 2005 008 612    8/2006
DE    10 2005 040 286    3/2007
(Continued)

OTHER PUBLICATIONS

International Search Report Issued Dec. 28, 2010 in PCT/EP10/052378 Filed Feb. 25, 2010.
(Continued)

*Primary Examiner* — Cam N. Nguyen
(74) *Attorney, Agent, or Firm* — Oblon, McClelland, Maier & Neustadt, L.L.P.

(57) ABSTRACT

Catalyst comprising ruthenium on a support for the catalytic oxidation of hydrogen chloride by means of oxygen to form chlorine, wherein the catalyst comprises from 0.01 to 10% by weight of silver and/or calcium as dopant.
The support preferably consists essentially of alpha-aluminum oxide.
The catalyst preferably comprises
 a) from 0.1 to 10% by weight of ruthenium,
 b) from 0.01 to 5% by weight of silver and/or from 0.01 to 5% by weight of calcium,
 c) from 0 to 5% by weight of one or more alkaline earth metals,
 d) from 0 to 5% by weight of one or more alkali metals,
 e) from 0 to 5% by weight of one or more rare earth metals,
 f) from 0 to 5% by weight of one or more further metals selected from the group consisting of nickel, palladium, platinum, iridium and rhenium,
in each case based on the total weight of the catalyst.

10 Claims, 1 Drawing Sheet

(51) Int. Cl.
*B01J 23/40* (2006.01)
*B01J 23/42* (2006.01)
*B01J 23/48* (2006.01)
*B01J 23/50* (2006.01)
*B01J 23/56* (2006.01)
*B01J 23/58* (2006.01)
*B01J 20/00* (2006.01)
*B01J 21/04* (2006.01)
*C01B 7/04* (2006.01)
*B01J 23/66* (2006.01)
*B01J 37/00* (2006.01)
*B01J 37/02* (2006.01)

(52) U.S. Cl.
CPC ............... *B01J 23/66* (2013.01); *B01J 37/0009* (2013.01); *B01J 37/0201* (2013.01); *B01J 37/0205* (2013.01)

(56) References Cited

U.S. PATENT DOCUMENTS

2008/0159948 A1   7/2008   Sesing et al.
2011/0014114 A1*  1/2011   Schubert et al. .............. 423/502

FOREIGN PATENT DOCUMENTS

EP        0 743 277      11/1996
GB        1 046 313      10/1966

OTHER PUBLICATIONS

U.S. Appl. No. 13/377,232, filed Dec. 9, 2011, Henze, et al.
U.S. Appl. No. 13/389,081, filed Feb. 6, 2012, Karches, et al.

* cited by examiner

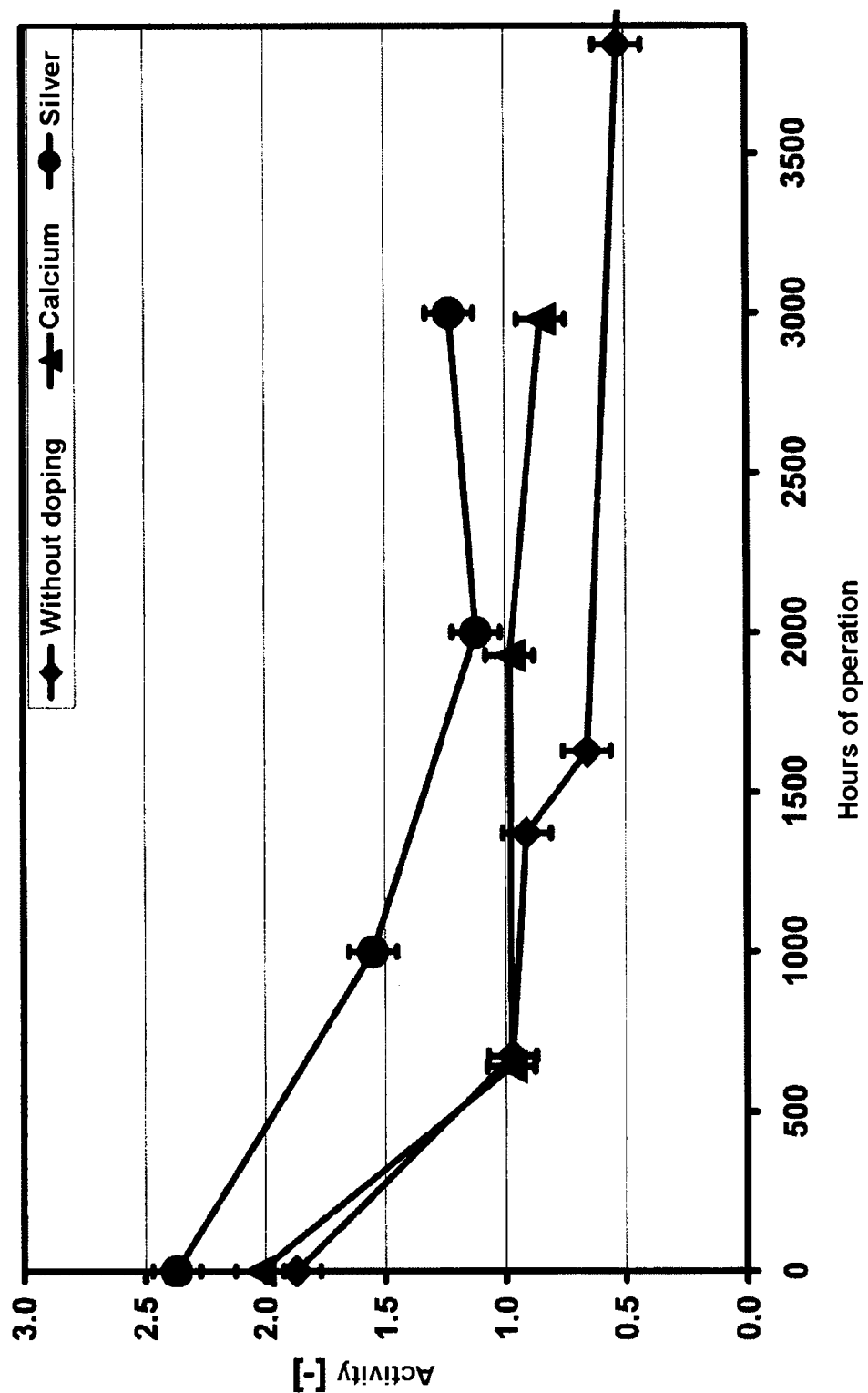

CATALYST COMPRISING RUTHENIUM AND SILVER AND/OR CALCIUM FOR THE OXIDATION OF HYDROGEN CHLORIDE

This application is a 371 of PCT/EP10/52378 filed Feb. 25, 2010. Priority to European patent application 09153716.7, filed Feb. 26, 2009, is claimed.

The invention relates to a catalyst for the catalytic oxidation of hydrogen chloride by means of oxygen to form chlorine and also a process for the catalytic oxidation of hydrogen chloride using this catalyst.

In the process of catalytic hydrogen chloride oxidation developed by a Deacon in 1868, hydrogen chloride is oxidized to chlorine by means of oxygen in an exothermic equilibrium reaction. The conversion of hydrogen chloride into chlorine enables the production of chlorine to be decoupled from the production of sodium hydroxide by chloralkali electrolysis. Such decoupling is attractive since the world demand for chlorine is growing more strongly than the demand for sodium hydroxide. In addition, hydrogen chloride is obtained in large amounts as coproduct in, for example, phosgenation reactions, for instance in isocyanate production.

EP-A 0 743 277 discloses a process for preparing chlorine by catalytic oxidation of hydrogen chloride, in which a supported ruthenium-comprising catalyst is used. Here, ruthenium is applied in the form of ruthenium chloride, ruthenium oxychlorides, chlororuthenate complexes, ruthenium hydroxide, ruthenium-amine complexes or further ruthenium complexes to the support. The catalyst can comprise palladium, copper, chromium, vanadium, manganese, alkali metals, alkaline earth metals and rare earth metals as further metals.

According to GB 1,046,313, ruthenium(III) chloride on aluminum oxide is used as catalyst in a process for the catalytic oxidation of hydrogen chloride.

DE 10 2005 040286 A1 discloses a mechanically stable catalyst for the oxidation of hydrogen chloride, which comprises, on alpha-aluminum oxide as support,
 a) from 0.001 to 10% by weight of ruthenium, copper and/or gold,
 b) from 0 to 5% by weight of one or more alkaline earth metals,
 c) from 0 to 5% by weight of one or more alkali metals,
 d) from 0 to 10% by weight of one or more rare earth metals,
 e) from 0 to 10% by weight of one or more further metals selected from the group consisting of palladium, platinum, osmium, iridium, silver and rhenium.

Promoters suitable for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such scandium, yttrium, lanthanum, cerium, praseodymium and neodymium, preferably scandium, yttrium, lanthanum and cerium, particularly preferably lanthanum and cerium, or mixtures thereof, also titanium, manganese, molybdenum and tin.

The catalysts of the prior art are still cable of improvement in respect of their catalytic activity and long-term stability. Particularly after a relative long period of operation of several 100 hours, the activity of the known catalysts decreases significantly.

It is an object of the present invention to provide catalysts for the catalytic oxidation of hydrogen chloride which have improved catalytic activity and long-term stability.

The object is achieved by a catalyst comprising ruthenium on a support for the catalytic oxidation of hydrogen chloride by means of oxygen to form chlorine, wherein the catalyst comprises from 0.01 to 5% by weight of silver and/or from 0.01 to 5% by weight of calcium.

It has been found that a ruthenium-comprising catalyst doped with at least one of the metals from the group consisting of silver and calcium has a higher activity than a catalyst without silver and calcium. It is presumed that this increase in activity is attributable, firstly, to the promoting properties of silver chloride and calcium chloride and also to a better dispersion of the active component on the surface of the catalyst brought about by silver chloride and calcium chloride. Thus, ruthenium is present as $RuO_2$ crystallites having a crystallite size of <7 nm on the catalyst of the invention in fresh or regenerated form. The crystallite size is determined via the width at half height of the reflection of the species in the XRD pattern. It is presumed that silver and calcium serve as sintering barriers and thus prevent growth of the $RuO_2$ crystallites.

The catalyst can be doped with silver, calcium or both metals. In a preferred embodiment, the catalyst comprises from 0.01 to 5% by weight, preferably from 0.1 to 1.5% by weight, of silver. In a further preferred embodiment, the catalyst comprises from 0.01 to 5% by weight, preferably from 0.1 to 2.0% by weight, of calcium.

In the case of a fluidized-bed catalyst, the silver content of the doped fluidized-bed catalyst is preferably not more than 1.0% by weight, since AgCl tends to form bridges and the particles of the fluidized-bed catalyst could conglutinate.

Suitable support materials are silicon dioxide, aluminum oxide, titanium dioxide or zirconium dioxide. Preferred supports are silicon dioxide, aluminum oxide and titanium dioxide, with particular preference being given to aluminum oxide and titanium dioxide. A very particularly preferred support is alpha-aluminum oxide.

In general, the catalyst of the invention is used for carrying out gas-phase reactions at a temperature above 200° C., preferably above 320° C., particularly preferably above 350° C. The reaction temperature is, however, generally not more than 600° C., preferably not more than 500° C.

In addition to silver or calcium, the catalyst of the invention can comprise further metals as promoters. These are usually comprised in the catalyst in amounts of up to 10% by weight, based on the weight of the catalyst.

The catalysts of the invention comprising ruthenium and silver and/or calcium for the catalytic oxidation of hydrogen chloride can additionally comprise compounds of one or more other transition metals selected from among nickel, palladium, platinum, iridium and rhenium. The catalysts can also be doped with one or more further metals. Suitable promoters for doping are alkali metals such as lithium, sodium, potassium, rubidium and cesium, preferably lithium, sodium and potassium, particularly preferably potassium, alkaline earth metals such as magnesium, strontium and barium, preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof, also titanium, manganese, molybdenum and tin.

Catalysts of the invention which are preferred for the oxidation of hydrogen chloride comprise
 a) from 0.1 to 10% by weight of ruthenium,
 b) from 0.01 to 10% by weight of silver and/or calcium,
 c) from 0 to 5% by weight of one or more alkaline earth metals,
 d) from 0 to 5% by weight of one or more alkali metals, e) from 0 to 5% by weight of one or more rare earth metals, f) from 0 to 5% by weight of one or more further metals selected from the group consisting of nickel, palladium, platinum, iridium and rhenium, in each case based on the total weight of the catalyst. The percentages by weight relate to the weight of the metal even if the metals are generally present in oxidic or chloridic form on the support.

In general, the total content of further metals c) to f) which are present in addition to ruthenium, silver and/or calcium is not more than 5% by weight.

The catalyst of the invention very particularly preferably comprises from 0.5 to 5% by weight of ruthenium and a total of from 0.1 to 2.0% by weight of silver and/or calcium, based on the weight of the catalyst. In a specific embodiment, the catalyst of the invention comprises from about 1.0 to 2.0% by weight of ruthenium and from 0.2 to 1.0% by weight of silver on alpha-aluminum oxide as support and no further active metals and promoter metals, with ruthenium being present as $RuO_2$. In a further specific embodiment, the catalyst of the invention comprises from about 1.0 to 2.0% by weight of ruthenium and from 0.5 to 1.0% by weight of calcium on alpha-aluminum oxide as support and no further active metals and promoter metals, with ruthenium being present as $RuO_2$.

The catalysts of the invention are obtained by impregnating the support material with aqueous solutions of salts of the metals. The metals are applied in the usual way as aqueous solutions of their chlorides, oxychlorides or oxides to the support. Silver is preferably applied in the form of an aqueous silver nitrate solution, and calcium is preferably applied in the form of an aqueous calcium chloride solution. Shaping of the catalyst can be carried out after or preferably before impregnation of the support material. The catalysts of the invention are also used as fluidized-bed catalysts in the form of powder having an average particle size of 10-200 µm. As fixed-bed catalysts, they are generally used in the form of shaped catalyst bodies.

The supported ruthenium catalysts can be obtained, for example, by impregnating the support material with aqueous solutions of $RuCl_3$ and $AgNO_3$ or $CaCl_2$ and, if appropriate, the further promoters for doping, preferably in the form of their chlorides. Shaping of the catalyst can be carried out after or preferably before impregnation of the support material.

The shaped bodies or powder can subsequently be dried and if appropriate calcined at temperatures of from 100 to 400° C., preferably from 100 to 300° C., for example under a nitrogen, argon or air atmosphere. The shaped bodies or powder are preferably firstly dried at from 100 to 150° C. and subsequently calcined at from 200 to 400° C.

The invention also provides a process for producing catalysts by impregnating the support materials with one or more metal salt solutions comprising the active metal or metals and optionally one or more promoter metals and drying and calcining the impregnated support. Shaping to give shaped catalyst particles can be carried out before or after impregnation. The catalyst of the invention can also be used in powder form.

Suitable shaped catalyst bodies are any shapes, preferably pellets, rings, cylinders, stars, wagon wheels or spheres, particularly preferably rings, cylinders or star extrudates.

The specific surface area of the particularly preferred alpha-aluminum oxide support before deposition of the metal salts is generally in the range from 0.1 to 10 m²/g. alpha-Aluminum oxide can be prepared by heating gamma-aluminum oxide to temperatures above 1000° C., and it is preferably prepared in this way. In general, calcination is carried out for from 2 to 24 hours.

The present invention also provides a process for the catalytic oxidation of hydrogen chloride by means of oxygen to form chlorine over the catalyst of the invention.

For this purpose, a hydrogen chloride stream and an oxygen-comprising stream are fed into an oxidation zone and hydrogen chloride is partly oxidized to chlorine in the presence of the catalyst to give a product gas stream comprising chlorine, unreacted oxygen, unreacted hydrogen chloride and water vapor. The hydrogen chloride stream, which can originate from a plant for preparing isocyanates, can comprise impurities such as phosgene and carbon monoxide.

Usual reaction temperatures are in the range from 150 and 500° C., and usual reaction pressures in the range from 1 to 25 bar, for example 4 bar. The reaction temperature is preferably >300° C., particularly preferably from 350° C. to 450° C. Furthermore, it is advantageous to use oxygen in superstoichiometric amounts. It is usual to employ, for example, a 1.5- to four-fold oxygen excess. Since losses of selectivity do not have to be feared, it can be economically advantageously to work at relatively high pressures and accordingly at residence times longer than those at atmospheric pressure.

Customary reaction apparatuses in which the catalytic oxidation of hydrogen chloride is carried out according to the invention are fixed-bed or fluidized-bed reactors. The oxidation of hydrogen chloride can be carried out in one or more stages.

The catalyst bed or the fluidized catalyst bed can comprise further suitable catalysts or additional inert material in addition to the catalyst of the invention.

The catalytic oxidation of hydrogen chloride can be carried out adiabatically or preferably isothermally or approximately isothermally, batchwise or preferably continuously as a fluidized-bed or fixed-bed process, preferably as fixed-bed process, particularly preferably in shell-and-tube reactors at reactor temperatures of from 200 to 500° C., preferably from 300 to 400° C., and a pressure of from 1 to 25 bar, preferably from 1 to 5 bar.

In the isothermal or approximately isothermal mode of operation, it is also possible to use a plurality of reactors, for example from 2 to 10 reactors, preferably from 2 to 6 reactors, particularly preferably from 2 to 5 reactors, in particular 2 or 3 reactors, connected in series with additional intermediate cooling. The oxygen can either or be added together with the hydrogen chloride upstream of the first reactor or the addition of oxygen can be distributed over the various reactors. This arrangement of individual reactors in series can also be combined in one apparatus.

In one embodiment of the fixed-bed process, a structured catalyst bed in which the catalyst activity increases in the flow direction is used. Such structuring of the catalyst bed can be achieved by different impregnation of the catalyst support with active composition or by different dilution of the catalyst bed with an inert material. As inert material, it is possible to use, for example, rings, cylinders or spheres of titanium dioxide, zirconium dioxide or mixtures thereof, aluminum oxide, steatite, ceramic, glass, graphite or stainless steel. The inert material preferably has similar external dimensions to the shaped catalyst bodies.

The conversion of hydrogen chloride in a single pass can be limited to from 15 to 90%, preferably from 40 to 85%. Unreacted hydrogen chloride can, after it has been separated off, be partly or completely recirculated to the catalytic oxidation of hydrogen chloride. The volume ratio of hydrogen chloride to oxygen at the reactor inlet is generally in the range from 1:1 to 20:1, preferably from 1.5:1 to 8:1, particularly preferably from 1.5:1 to 5:1.

The chlorine formed can then be separated off in a customary manner from the product gas stream obtained in the catalytic oxidation of hydrogen chloride. The separation usually comprises a plurality of stages, namely removal and if appropriately recirculation of unreacted hydrogen chloride from the product gas stream from the catalytic oxidation of hydrogen chloride, drying of the resulting residual gas stream consisting essentially of chlorine and oxygen and separation of chlorine from the dried stream.

A used, ruthenium-comprising hydrogen chloride oxidation catalyst can be regenerated by:
  a) reducing the catalyst in a gas stream comprising hydrogen chloride and optionally an inert gas at a temperature of from 300 to 500° C.,
  b) recalcining the catalyst in an oxygen-comprising gas stream at a temperature of from 200 to 450° C.

It has been found that $RuO_2$ can be reduced by means of hydrogen chloride. It is assumed that the reduction occurs via $RuCl_3$ to elemental ruthenium. Thus, if a partially deactivated catalyst comprising ruthenium oxide is treated with hydrogen chloride, ruthenium oxide is presumably reduced quantitatively to ruthenium and/or ruthenium chloride after a sufficiently long treatment time. This reduction destroys the $RuO_2$ crystallites and the ruthenium, which can be present as elemental ruthenium, as a mixture of ruthenium chloride and elemental ruthenium or as ruthenium chloride, is redispersed on the support. After the reduction, the elemental ruthenium can be reoxidized to the catalytically active $RuO_2$ by means of an oxygen-comprising gas, for example air. It has been found that the catalyst obtained in this way once again has approximately the same activity as the fresh catalyst. An advantage of the process is that the catalyst can be regenerated in situ in the reactor and does not have to be removed from the reactor.

The invention is illustrated by the following examples.

EXAMPLES

Example 1

Comparative Catalyst without Doping 100 g of $\alpha$-$Al_2O_3$ (powder, average diameter d=50 μm) are impregnated with 36 ml of an aqueous ruthenium chloride solution (ruthenium concentration: 4.2%) in a rotating glass flask. The moist solid is dried at 120° C. for 16 hours. The resulting dry solid is calcined in air at 380° C. for 2 hours.

Example 2

Catalyst with Silver Doping 700 g of $\alpha$-$Al_2O_3$ (powder, d=50 μm) are sprayed with 252 ml of an aqueous solution comprising silver nitrate (Ag content: 1.4% by weight) in a rotating glass flask. The resulting moist solid is dried at 120° C. for 16 hours and subsequently calcined in air at 380° C. for 5 hours. The resulting solid is sprayed with 252 ml of a ruthenium chloride solution (Ru content: 4.2% by weight) in a rotating glass flask. The resulting moist solid is firstly dried at 120° C. for 16 hours and subsequently calcined in air at 380° C. for 2 hours. If the catalyst is doped with $AgNO_3$ and subsequently calcined to form $Ag_2O$, AgCl is formed by the subsequent impregnation with ruthenium chloride and/or under the reaction conditions and leads to stabilization of the catalyst. The finished catalyst comprises 1.5% by weight of ruthenium and 0.5% by weight of silver as dopant.

Example 3

Catalyst with Calcium Doping 50 g of $\alpha$-$Al_2O_3$ (powder, d=50 μm) are impregnated with 18 ml of an aqueous solution of ruthenium chloride (ruthenium concentration: 4.2%) and calcium chloride (calcium concentration: 2.1%) in a rotating glass flask. The moist solid is dried at 120° C. for 16 hours. The resulting dry solid is calcined in air at 380° C. for 2 hours. The finished catalyst comprises 1.5% by weight of ruthenium and 0.75% by weight of calcium as dopant.

Example 4

The catalysts produced as described in examples 1 to 3 were examined in respect of their activity and their long-term stability:

600 g of the catalysts produced as described in examples 1 to 3 are supplied with 200 standard $l \cdot h^{-1}$ of HCl and 100 standard $l \cdot h^{-1}$ at temperatures in the range from 360 to 380° C. in a fluidized-bed reactor having a diameter of 44 mm, a height of 990 mm and a bed height of from 300 to 350 mm.

After particular periods of operation, catalyst samples are taken. These are examined as follows in respect of conversion and activity:

5 g in each case of the samples of the catalysts as described in examples 1 to 3 which have been taken are mixed with 115 g of the corresponding support material as inert material and 7.0 standard l/h of HCl and 3.5 standard l/h of $O_2$ are passed through from below via a glass frit at 360° C. in a fluidized-bed reactor (d=29 mm; height of the fluidized bed from 20 to 25 cm). The HCl conversion is determined by passing the resulting gas stream into a potassium iodide solution and subsequently titrating the iodine formed with a sodium thiosulfate solution. The HCl conversions achieved using the catalyst as described in example 1 comprising 2.0% by weight of $RuO_2$ on $\alpha$-$Al_2O_3$ is 49.7% after 675 hours of operation and is assigned an activity of 1.0 for comparative purposes.

The results are shown in FIG. 1. There, the activity (in arbitrary units) is plotted against the period of operation (in h) for the catalysts as described in example 1 (undoped, diamonds), example 2 (Ag doping, triangles) and example 3 (Ca doping, circles). In the case of silver doping, both the initial activity (due to the promoting properties of silver) and also the long-term stability of the catalyst are improved (i.e. the activity decreases to a lesser extent with increasing time of operation than in the case of an undoped catalyst). In the case of calcium doping, the initial activity of the catalyst is virtually unchanged compared to the undoped catalyst, while the long-term stability is improved.

The invention claimed is:

1. A catalyst, comprising from 1.0 to 2.0% by weight of ruthenium and from 0.2 to 1.0% by weight of silver or from 0.5 to 1.0% by weight of calcium on an alpha-aluminum oxide support, wherein:
  the catalyst comprises no other active metals or promoter metals,
  ruthenium is present as $RuO_2$, and
  the catalyst can catalytically oxidize hydrogen chloride with oxygen to form chlorine.

2. The catalyst of claim 1, wherein the specific surface area of the alpha-aluminum oxide support is in the range from 0.1 to 10 $m^2/g$.

3. The catalyst of claim 1, comprising from 1.0 to 2.0% by weight of ruthenium and from 0.2 to 1.0% by weight of silver.

4. The catalyst of claim 3, wherein the specific surface area of the alpha-aluminum oxide support is in the range from 0.1 to 10 $m^2/g$.

5. The catalyst of claim 4, comprising 1.5% by weight of ruthenium and 0.5% by weight of silver.

6. The catalyst of claim 4, comprising 1.5% by weight of ruthenium and 0.75% by weight of calcium.

7. The catalyst of claim 1, comprising from 1.0 to 2.0% by weight of ruthenium and from 0.5 to 1.0% by weight of calcium.

8. The catalyst of claim 7, wherein the specific surface area of the alpha-aluminum oxide support is in the range from 0.1 to 10 $m^2/g$.

9. A process for the catalytic oxidation of hydrogen chloride, the process comprising combining hydrogen chloride with oxygen to form chlorine over a catalyst bed comprising catalyst particles of the catalyst of claim 1.

10. The process of claim 9, wherein the catalyst bed is a fixed bed or a fluidized bed.

\* \* \* \* \*